United States Patent [19]

Geschwender

[11] 4,358,124
[45] * Nov. 9, 1982

[54] UTILITY CART

[75] Inventor: Robert C. Geschwender, Lincoln, Nebr.

[73] Assignee: Concept Engineering, Inc., Lincoln, Nebr.

[*] Notice: The portion of the term of this patent subsequent to Sep. 2, 1997, has been disclaimed.

[21] Appl. No.: 169,936

[22] Filed: Jul. 18, 1980

Related U.S. Application Data

[63] Continuation-in-part of Ser. No. 945,858, Sep. 26, 1978, Pat. No. 4,220,346.

[51] Int. Cl.³ ............................................. B62B 1/04
[52] U.S. Cl. .............................. 280/47.18; 280/47.28; 280/47.34; 280/654
[58] Field of Search ...................... 280/47.37 R, 47.28, 280/47.29, 47.27, 654, 47.24, 47.18, 47.17; 414/446, 444, 457

[56] References Cited

U.S. PATENT DOCUMENTS 2,484,795 10/1949 Schofield ................. 280/47.37 R X
2,775,465 12/1956 Swingler .................... 280/47.33 X
3,782,752 1/1974 Gobetz ....................... 280/47.19
3,827,707 8/1974 Bierman ................... 280/47.24 X
4,220,346 9/1980 Geschwender ............... 280/47.18

FOREIGN PATENT DOCUMENTS 1110542 4/1968 United Kingdom ............ 280/47.34

Primary Examiner—Richard A. Bertsch
Assistant Examiner—Donald W. Underwood
Attorney, Agent, or Firm—Senniger, Powers, Leavitt and Roedel

[57] ABSTRACT

A utility cart comprising an upwardly extending frame, a pair of wheels journalled on the lower end of the frame at opposite sides of the frame, and a bed pivoted at one of its ends on the frame at the lower end of the frame for swinging about an axis extending from side-to-side of the frame between an extended position in which the bed extends generally perpendicularly forwardly from the frame and an upright position in which the bed extends upwardly alongside the frame. The bed has a support at one end extending forwardly from the bed when the bed is in its upright position for supporting an object to be carried on the cart. Legs are mounted at the other end of the bed for movement between a first position for supporting the bed when in its extended position, and a second folded position. The legs can be locked in their bed-supporting position.

22 Claims, 13 Drawing Figures

FIG.1
FIG.2
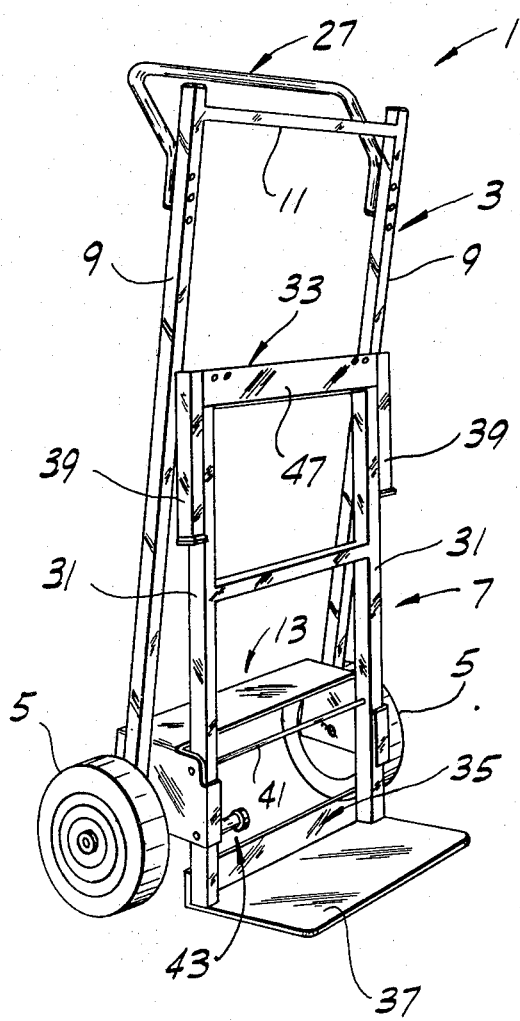
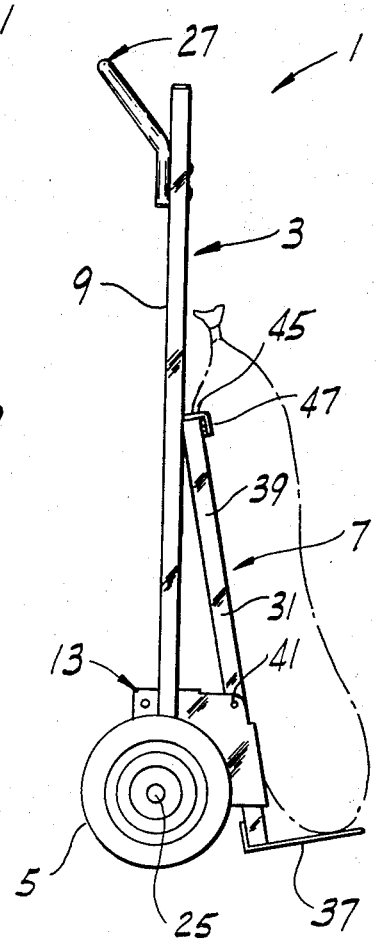

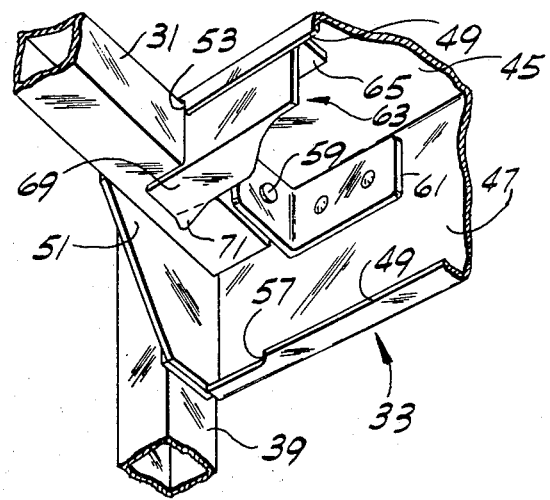
FIG. 4
FIG. 3
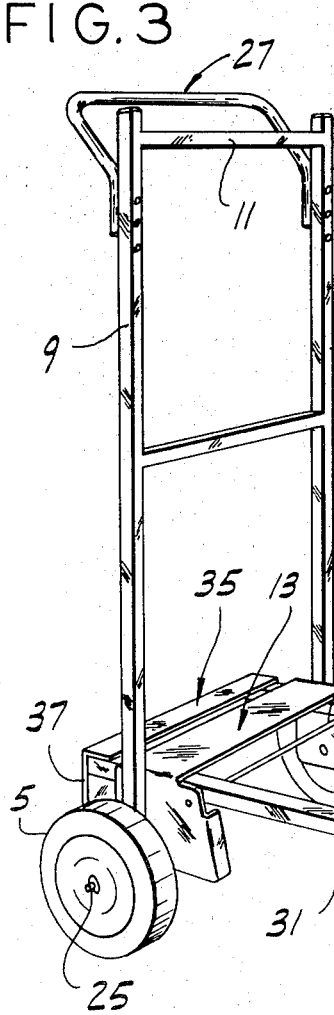
FIG. 5
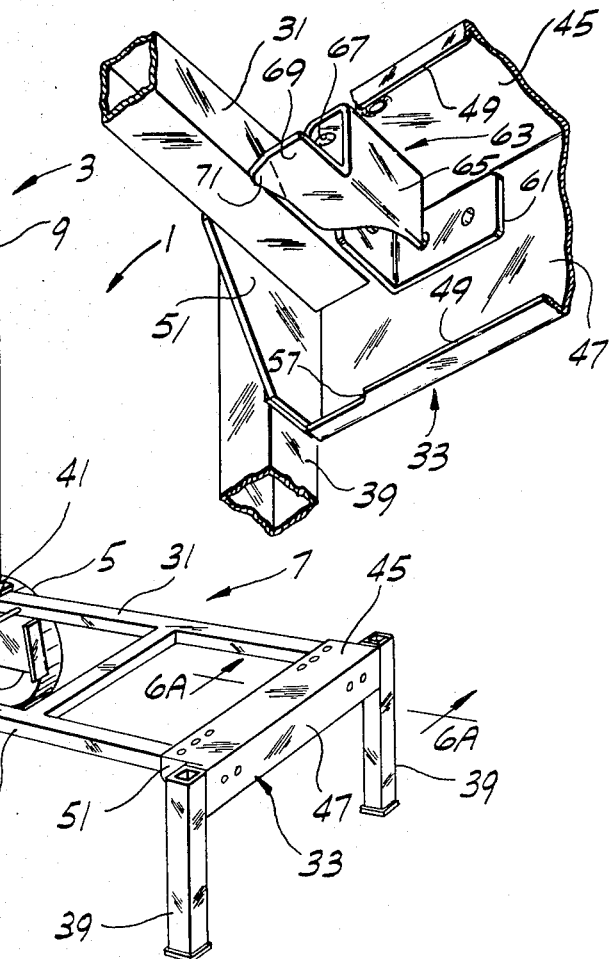

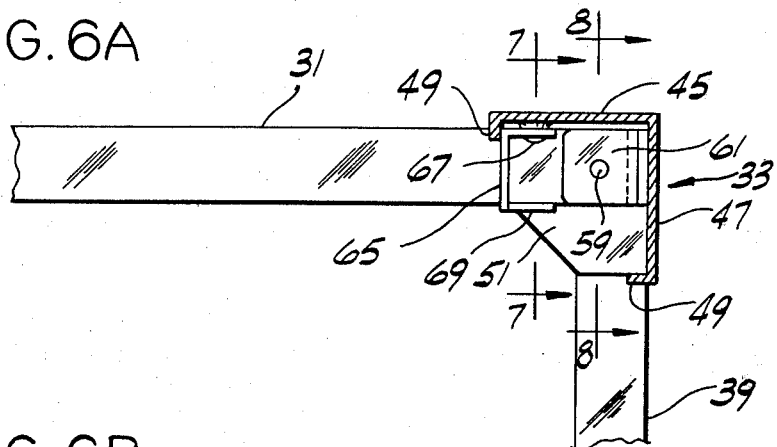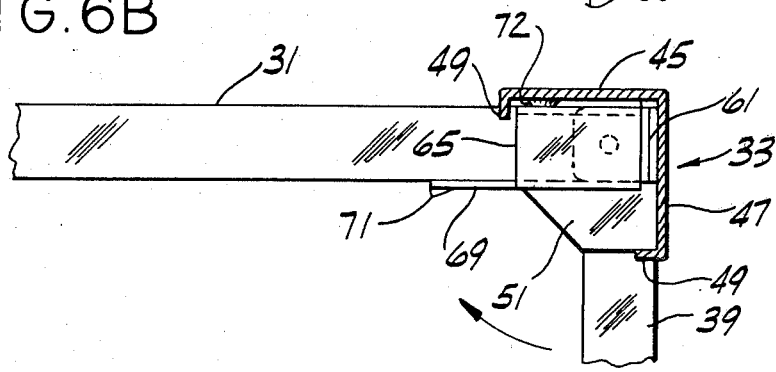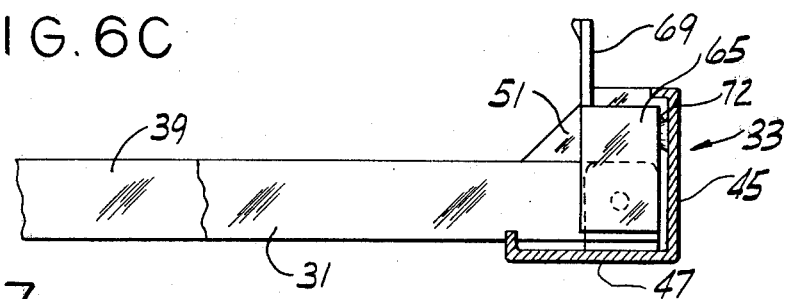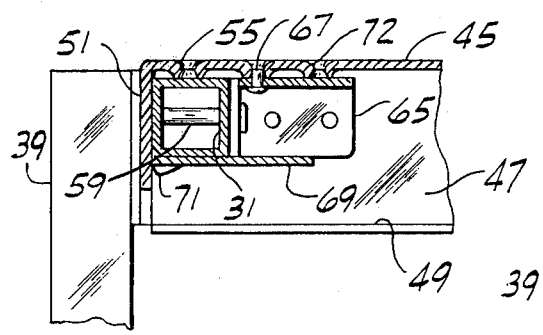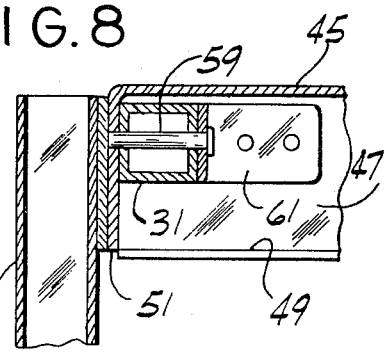

UTILITY CART

CROSS REFERENCE TO RELATED APPLICATION

This is a continuation-in-part of my pending U.S. application Ser. No. 945,858, filed Sept. 26, 1978, now U.S. Pat. No. 4,220,346.

BACKGROUND OF THE INVENTION

My above-mentioned pending application relates to a multipurpose utility cart which in one mode functions as a conventional two-wheel dolly for transporting loads relatively small in size and in another mode as a flat-bed cart for transport and storage of larger loads. The present invention relates to the same type of cart but with several improvements over the cart described in the aforesaid application.

SUMMARY OF THE INVENTION

Among the several objects of this invention may be noted the provision of an improved utility cart of the type described above which is readily convertible from one mode to another and which may be selectively locked in either mode; the provision of such a cart which has a multitude of uses, being adapted to function, for example, as a conventional two-wheel dolly and also as a flat-bed cart; the provision of such a cart which is easily maneuverable; the provision of such a cart which is adjustable to suit the height of the user; the provision of such a cart which has foldable legs for convenient use and storage of the cart; and the provision of such a cart which is safe to use, economical and durable in construction.

Generally, a utility cart of this invention comprises an upwardly extending frame, a pair of wheels journalled on the lower end of the frame at opposite sides of the frames for rotation about an axis extending transversely of the frame, and a bed pivoted toward one of its ends, constituting its back end, on the frame at the lower end of the frame for swinging about an axis generally parallel to the axis of rotation of the wheels between an extended position in which the bed extends generally perpendicularly forwardly from the frame and an upright position in which the bed extends alongside the frame. The cart further comprises support means at the back end of the bed adapted to extend downwardly from the bed when the latter is in its extended position and forwardly from the bed when the latter is in its upright position for supporting an object to be carried on the cart. Legs are mounted at the front end of the bed for movement between a first position for supporting the bed when in its extended position, and a second folded position. Means is provided for locking the legs in their bed-supporting position. Other objects and features will be in part apparent and in part pointed out hereinafter.

BRIEF DESCRIPTION OF THE DRAWINGS

FIG. 1 is a perspective of a cart of this invention in one mode in which it functions as a two-wheel dolly;

FIG. 2 is a side elevation of the cart shown in FIG. 1;

FIG. 3 is a perspective depicting the cart in a second extended mode in which it functions as a flatbed cart;

FIG. 4 is a partial perspective of the underside of the bed at one front corner thereof, showing a latch in its latching position for locking the foldable front legs of the cart in a bed-supporting position;

FIG. 5 is a view similar to FIG. 4 showing the latch in a release position for enabling the legs to be swung to their folded position;

FIG. 6A is an enlarged vertical section taken on lines 6A—6A of FIG. 3, the leg being shown in its bed-supporting position and the latch being shown in its latching position;

FIG. 6B is a view similar to FIG. 6A showing the latch in its release position;

FIG. 6C is a view similar to FIGS. 6A and 6B showing the latch in its release position and the leg in its folded position alongside the bed;

FIG. 7 is an enlarged vertical section taken on line 7—7 of FIG. 6A;

FIG. 8 is an enlarged vertical section on line 8—8 of FIG. 6A;

Corresponding reference characters indicate corresponding parts throughout the several views of the drawings.

DESCRIPTION OF A PREFERRED EMBODIMENT

Figure 9:
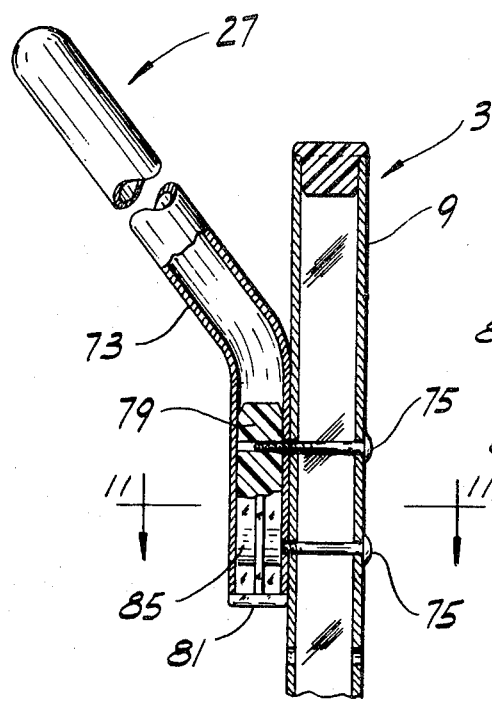
FIG. 9 is an enlarged view of a portion of FIG. 2 showing the handle of the cart, portions being broken away for purposes of illustration.
Figure 10:
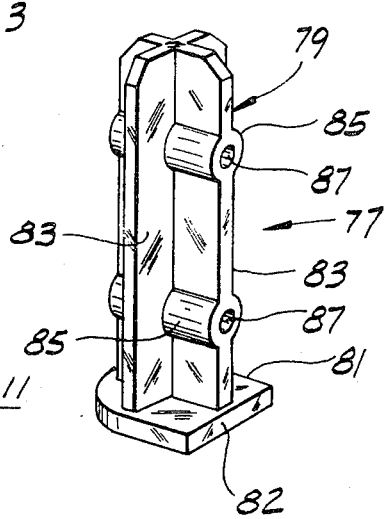
FIG. 10 is a perspective of an insert received in the handle of FIG. 9.

Referring now to the drawings, particularly to FIGS. 1 and 2, a utility cart of this invention is designated in its entirety by the reference numeral 1. Except as hereinafter noted, this cart is essentially of the same construction as the cart described in my above-mentioned pending application and corresponding parts hereinafter referred to will be given the same reference numerals as used in that application. As shown in the present application, the cart comprises a generally rectangular, upwardly extending frame 3, and two wheels, each designated 5, journalled on the lower end of the frame at opposite sides of the frame for rotation about an axis extending transversely of the frame. Indicated generally at 7 is a rectangular framework consituting a bed pivoted adjacent one of its end (its back end) on the frame at the lower end of the frame for swinging about an axis generally parallel to but spaced forward (to the right as viewed in FIGS. 1 and 2) and above the axis of rotation of the wheels. The bed is swingable between an upright position (FIG. 1) in which it extends upwardly alongside the frame at the front of the frame, and an extended or unfolded position (FIG. 3) in which it extends generally perpendicularly forwardly from the frame in a generally horizontal direction.

More particularly, frame 3 comprises a pair of vertical spaced-apart side frame members 9 of square-section tubular bar stock connected at their upper ends by an upper cross frame member 11, also of tubular bar stock, and at their lower ends by a lower cross frame member generally designated 13. The wheels of the cart are pinned at 25 to the lower cross frame member for rotation. Indicated generally at 27 is a handle of inverted U-shape interconnecting the upper ends of the side frame members 9. This handle construction differs from that shown in my above-mentioned pending application and is described in more detail hereinbelow.

As shown best in FIG. 3 in which it is illustrated in its extended position, the bed 7 is generally rectangular in shape, comprising a pair of parallel side rails 31 extending longitudinally of the bed at opposite sides of the bed, and front and back cross members designated 33 and 35, respectively, interconnecting the side rails at the front and back of the bed. The side rails 31, which are of square-section tubular bar stock, and the back cross member 35, which is in the from of a plate having a toe piece 37 bent down from the back (left) end of the plate on the underside of the bed, are identical to rails 31 and cross member 35 described in my pending application. However, as will be described later in this application, front cross member 33 is of different construction. A pair of legs 39, also of tubular bar stock and of square cross section, are mounted on the bed at its front end on the outside of rails 31.

The bed is swingable between its extended and upright positions on a rod 41 mounted on the lower cross frame member 13 and extending through rails 31 adjacent the back end of the bed. When the bed is in its extended position, the toe piece 37 of plate 35 extends downwardly from the bed at the back end of the bed. However, when the bed is in its upright position, the toe piece extends forwardly at the lower end of the bed and constitutes means for supporting an object to be carried on the cart. A detent assembly generally designated 43 constitutes means for selectively locking the bed in its upright and extended positions. This assembly is identical to that described in my pending application.

In accordance with this invention, legs 39 are pivoted at opposite sides of the bed for swinging about an axis extending in side-to-side direction with respect to the bed between a first bed-supporting position (FIG. 3) in which they extend down from the bed for supporting it when in its extended position, and a second folded position (FIGS. 1 and 2) in which they extend generally alongside rails 31 of the bed. More specifically, legs 39 are rigidly secured, as by welding, to opposite ends of the front cross member 33, which is in the form of an angle bar pivotally connected at its end to side rails 31. Thus the angle bar and legs pivot relative to the side rails as a unit. As best shown in FIGS. 4 and 5, angle bar 33 is generally L-shaped in vertical section, comprising a pair of flanges 45, 47, the longitudinal edge of each being bent to form a lip 49 extending generally at right angles to the inside face of the flange, and two gussets 51 (one at each end of angle bar 33) to which the legs 39 are welded. When the legs are in their bed-supporting position (FIGS. 4 and 6A, for example), flange 47 extends vertically at the front of the bed and flange 45 extends generally horizontally rearwardly (to the left) therefrom over the tops of the side rails, which are received in notches 53 in lip 49 of flange 45. As indicated at 55 in FIG. 7 flange 45 is deformed downwardly adjacent each of its ends for engagement with the tops of side rails 31 when the legs are unfolded. When the legs are swung clockwise 90° to their folded position (compare FIGS. 6B and 6C), flange 45 extends vertically at the front of the bed and flange 47 extends generally horizontally rearwardly therefrom below side rails 31, the latter being received in notches 57 in lip 49 of flange 47.

Angle bar 33 is pivotally connected at each of its ends to a respective side rail 31 by means of a pin 59 carried by an L-shaped bracket 61 secured (riveted) to flange 47 of the angle bar. Pin 59 extends in transverse direction with respect to the bead through side rail 31 into the gusset 51 (see FIGS. 7 and 8). Thus angle bar 3 is swingable on pins 59 for enabling legs 39 to be swung between their bed-supporting and folded positions.

A pair of identical latches 63 mounted at opposite ends of angle bar 33 constitute means for locking the legs 39 of the cart in their bed-supporting position. Each latch comprises a channel-shaped latch body 65 riveted as indicated at 67 in FIG. 7 to flange 45 of the angle bar, and a latching arm 69 extending in cantilever fashion beyond an end of the body 65. The latch may be pivoted on rivet 67 about an axis extending generally parallel to leg 39 between a latching position (FIG. 4) in which latching arm 69 is engageable with the bottom of a respective side rail 31 for latching the leg in its bed-supporting position, and a release position (FIG. 5) in which the latching arm is clear of the side rail. With both latches in this latter position, the legs (and angle bar 35) may be swung clockwise to a position in which the legs are folded alongside the side rails. As indicated at 71, the outer corner of each latching arm 69 is bent down to enable the latch to be readily swung from its release to its latching position. As shown in FIG. 7, flange 45 of angle bar 33 is deformed downwardly as indicated at 72 for engagement by the latching body 65 of latch 63 when the latter is in its latching position. This serves to hold the latching arm 69 tight up against the bottom of the side rail 31 to rigidly lock the legs in their bed-supporting position. While the use of two latches 63 (one for each leg 39) is preferable, it will be understood that one latch could also be used since legs 39 are integrally connected by angle bar 33 and, therefore, the latching of one leg in position would also serve to lock the other leg in the same position.

In view of the foregoing, it will be apparent that when the bed 7 is in its upright position, the utility cart 1 functions as a conventional two-wheel dolly for carrying loads. When the cart is being used in this mode the legs are generally swung to their folded position for enabling relatively tall wide loads to be conveniently carried on toe plate 37. However, if the load is relatively tall but narrow, the legs may be kept locked in their bed-supporting position, in which case they will extend forwardly at the upper end of the bed when it is in upright position to assist in holding the load on the cart. When the bed is in its extended horizontal position in which it is supported by legs 39, the cart serves as a flat-bed cart for transporting or storing loads of larger size. Of course, if the cart is to be rolled with the bed in this position, the upper end of the frame 3 must first be tilted back to raise the legs 39 off the ground.

Figure 11:
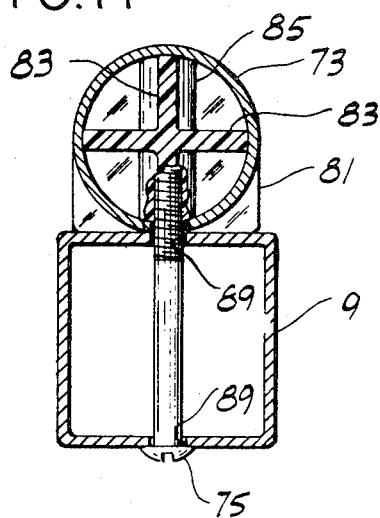
FIG. 11 is an enlarged horizontal section on line 11—11 of FIG. 9.

As mentioned above, handle 27 is of different construction than the handle shown in my pending application. As shown in FIGS. 1 and 9–11, the handle of the present invention comprises a single piece of round tubing bent to an inverted U-shape, having a pair of downwardly extending arms each designated 73. The lower end portion of each arm is bent as shown in FIG. 9 and is secured to the upper end of a respective side frame member 9 of frame 3. The arm 73 is secured to the frame member by means of two screws 75 (constituting fastening means) which extend through the side frame member and arm and are threaded into an insert generally indicated at 77 in the lower end of the arm. As shown, this insert comprises an elongate body 79 received in the arm and a relatively flat head 81 at the lower end of the body having a diameter greater than the inside diameter of the handle tubing so that it abuts up against the lower open end of the arm to close it. The head 81 is partially rounded to conform to the cross-sectional shape of arm 73, but is also formed with an edge 82 shaped to fit the contour of respective side frame members 9 to facilitate assembly. Thus, where the side frame members are square in cross section, as shown in FIG. 11, edge 82 is a relatively straight edge which butts up flat against the side frame member. The body 79 of the insert is generally cross-shaped in section, comprising a pair of long relatively narrow tongues 83 extending up from the head and intersecting along their longitudinal centerlines. One of the tongues is formed with a pair of bosses 85 extending transversely with respect to the tongue and spaced longitudinally of the tongue one above the other. These bosses 85 have axial bores 87 therethrough for threadably receiving screws 75 to fasten the arm to the side frame member 9. It will be observed that screws 75 do not protrude through the arms 73 of the handle, leaving the exposed surface of the handle smooth and entirely free of fasteners which would present a source of possible injury or inconvenience to the user of the cart.

It will be understood that the insert 77 described above and shown in the drawings may have other shapes, but the body 79 of the insert should be sized for a relatively snug fit inside the arm 73 to facilitate assembly of the cart and to ensure that alignment between bores 87 in the insert and the holes in the arm 73 is maintained.

Means is also provided for fastening the handle to the frame in a plurality of different elevations. In this regard, each side frame member 9 of the frame is shown as having three sets of holes 89 therein at different elevations, each set consisting of two holes at the same elevation through opposite walls of the frame member. The spacing between each pair of adjacent sets of holes is equal to the spacing between bores 87 in insert 77. By inserting screws 75 through appropriate adjacent sets of holes and threading them into the inserts in arms 73, the handle may be fastened to the frame 3 of the cart at an elevation which is particularly suited for the user of the cart. More than three sets of holes may be provided in each side frame member 9 for permitting a wider range of height adjustment.

While it is preferable that two screws be used to fasten each arm 73 of handle 27 to the frame of the cart, one screw could also be used without departing from the scope of this invention. In a construction of this type, the body 79 of each insert 77 would have only one bore 87 through it and, to provide for handle height adjustment, each side frame member 9 of the cart would have at least two sets of holes therein at different elevations, with screw 75 being adapted to extend through one set of holes for fastening the arm to the frame at one elevation and through the second set of holes for fastening the arm to the frame at a second elevation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. A utility cart comprising:
   an upwardly extending frame;
   a pair of wheels journalled on the lower end of the frame at opposite sides thereof for rotation about an axis extending transversely of the frame;
   a bed pivoted adjacent one of its ends, constituting its back end, on the frame at the lower end of the frame for swinging about an axis generally parallel to the axis of rotation of the wheels between an extended position in which the bed extends generally perpendicularly forwardly from the frame, and an upright position in which the bed extends alongside the frame;
   support means adjacent the back end of the bed for supporting an object to be carried on the cart when the bed is in its upright position;
   leg means mounted at the front end of the bed for movement between a first position for supporting the bed when in its extended position, and a second folded position; and
   means for locking said leg means in said first bed-supporting position.

2. A utility cart as set forth in claim 1 wherein said leg means comprises a pair of legs pivoted at opposite sides of the bed for swinging between said bed-supporting and folded positions.

3. A utility cart as set forth in claim 2 wherein said locking means comprises a latch for latching a leg in said bed-supporting position.

4. A utility cart as set forth in claim 3 wherein said latch is mounted on the bed for pivoting about an axis extending generally parallel to said leg when the latter is in its bed-supporting position between a latching position for latching said leg in said bed-supporting position, and a release position in which it is clear of said leg for enabling the latter to be swung to its folded position.

5. A utility cart as set forth in claim 2 wherein said legs are swingable about an axis extending in side-to-side direction with respect to the bed, the legs being adapted to extend down from the bed when in their bed-supporting position and generally alongside the bed when in their folded position.

6. A utility cart as set forth in claim 5 wherein said bed is generally rectangular in shape, comprising a pair of side rails and front and back cross members interconnecting the ends of the side rails at the front and back of the bed, said legs being mounted on said front cross member and being adapted to extend alongside said side rails when in their folded position.

7. A utility cart as set forth in claim 6 wherein said legs are rigidly secured to opposite ends of said front cross member, the latter being pivotally connected at its ends to the side rails of the bed for pivotal movement of the cross member and legs thereon about said axis extending in side-to-side direction with respect to the bed.

8. A utility cart as set forth in claim 7 wherein said locking means comprises a latch mounted on said front cross member adjacent one of said side rails for movement between a latching position in which it is engageable with said side rail for latching a respective leg in said bed-supporting position, and a release position in which it is clear of said side rail for permitting the leg to be swung to its folded position.

9. A utility cart as set forth in claim 8 wherein said front cross member is in the form of an angle bar generally L-shaped in cross section, having a first flange adapted to overlie said side rails when the legs are in their bed-supporting position, and a second flange adapted to underlie said rails when the legs are in their folded position.

10. A utility cart as set forth in claim 9 wherein said latch is mounted on said first flange adjacent one end of the crossbar for pivoting about an axis extending generally parallel to said legs between said latching and release positions.

11. A utility cart as set forth in claim 7 wherein said front cross member is pinned to each side rail for pivoting with respect thereto.

12. A utility cart comprising
an upwardly extending frame;
a pair of wheels journalled on the lower end of the frame at opposite sides thereof for rotation about an axis extending transversely of the frame;
a bed pivoted adjacent one of its ends constituting its back end, on the frame at the lower end of the frame for swinging about an axis generally parallel to the axis of rotation of the wheels between an extended position in which the bed extends generally perpendicularly forwardly from the frame, and an upright position in which the bed extends alongside the frame;
support means at the back end of the bed adapted to extend downwardly from the bed when the latter is in its extended position and forwardly from the bed when the latter is in its upright position for supporting an object to the carried on the cart; and
leg means at the front end of the bed for supporting the bed in its extended position;
said frame comprising a pair of generally parallel spaced-apart side frame members and a handle interconnecting the upper ends of the side frame members;
said handle being tubular and generally of inverted U-shape, having a pair of downwardly extending arms secured to the upper ends of said side frame members;
an insert inside the lower end of each arm; and
fastening means extending through each side frame member and respective arm and threaded into said insert inside the arm for fastening the arm to the frame member.

13. A utility cart as set forth in claim 12 wherein said fastening means comprises means for mounting a respective arm of said handle at a plurality of different elevations with respect to said side frame member.

14. A utility cart as set forth in claim 13 wherein said fastening means comprises a screw, and each side frame member has at least two sets of holes therein at different elevations, said screw being adapted to extend through one set of holes for fastening a respective arm to the side frame member at one elevation, and through the second set of holes for fastening the arm to the side frame member at a second elevation.

15. A utility cart as set forth in claim 12 wherein each of said arms is open at its lower end for insertion of said insert inside the arm.

16. A utility cart as set forth in claim 15 wherein said insert is sized for a relatively snug fit inside said arm.

17. A utility cart as set forth in claim 16 wherein said insert comprises an elongate body received inside the lower end of a respective arm, and a head at the lower end of the body sized for abutting up against the lower open end of the arm to close it.

18. A utility cart as set forth in claim 17 wherein said body is generally cross-shaped in section, comprising a pair of long relatively narrow tongues extending up from the head and intersecting along their longitudinal centerlines.

19. A utility cart as set forth in claim 18 wherein said fastening means comprises a pair of screws and each side frame member has at least three sets of holes therein at different elevations, said screws being adapted to extend through two adjacent sets of holes for fastening a respective arm to the side frame member at a selected elevation, one of said tongues being formed with a pair of bosses extending transversely with respect to the tongue and spaced apart longitudinally of the tongue, said bosses having axial bores therein for threadably receiving said screws.

20. A utility cart as set forth in claim 17 wherein said head is formed with an edge shaped to fit the contour of a respective side frame member.

21. A utility cart as set forth in claim 20 wherein said side frame member is generally rectangular in cross section and said head is formed with a relatively straight edge for butting up flat against said frame member.

22. A utility cart as set forth in claim 12 wherein said handle comprises a single piece of round tubing bent into inverted U-shape.

* * * * *